United States Patent
Staffin et al.

[15] 3,676,647
[45] July 11, 1972

[54] PARTICLE ANALYZING APPARATUS AND METHOD

[72] Inventors: Robert Staffin, Colonia; Roy J. Ricci, Red Bank, both of N.J.; Ronald J. Juels, New York, N.Y.

[73] Assignee: Procedyne Corporation, New Brunswick, N.J.

[22] Filed: Dec. 4, 1969

[21] Appl. No.: 881,951

[52] U.S. Cl. ............235/92 PC, 235/92 R, 235/92 PB, 250/222 M
[51] Int. Cl. .....................................G06m 11/04
[58] Field of Search ............235/92 PC, 92 PB; 356/39, 102; 340/146.3 F; 178/7.6; 250/222 M

[56] References Cited

UNITED STATES PATENTS 3,436,139  4/1969  Barkow.................................178/7.6
2,920,525  1/1960  Appel..................................235/92 PC Primary Examiner—Maynard R. Wilbur
Assistant Examiner—Robert F. Gnuse
Attorney—Leonard S. Knox

[57] ABSTRACT

On-line, real-time particle analyzing and counting apparatus operating continuously. The particles, suspended in a fluent medium flowing through a transparent chamber of pre-determined cross section, are scanned by a flying spot of minimum practical dimensions. A photodiode adjacent the face of the chamber opposite impingement of the spot is activated in accordance with interruption of the light transmitted through the flowing medium. Activation is proportional to the size and density of the particles and the output of the photodiode is translated into pulses which are measured and counted in accordance with their magnitude and frequency. The pulses are grouped within specified size ranges for convenience of counting.

19 Claims, 5 Drawing Figures

INVENTORS
Robert Staffin
Roy Ricci
Ronald J. Juels
By Leonard S. Knox
Atty

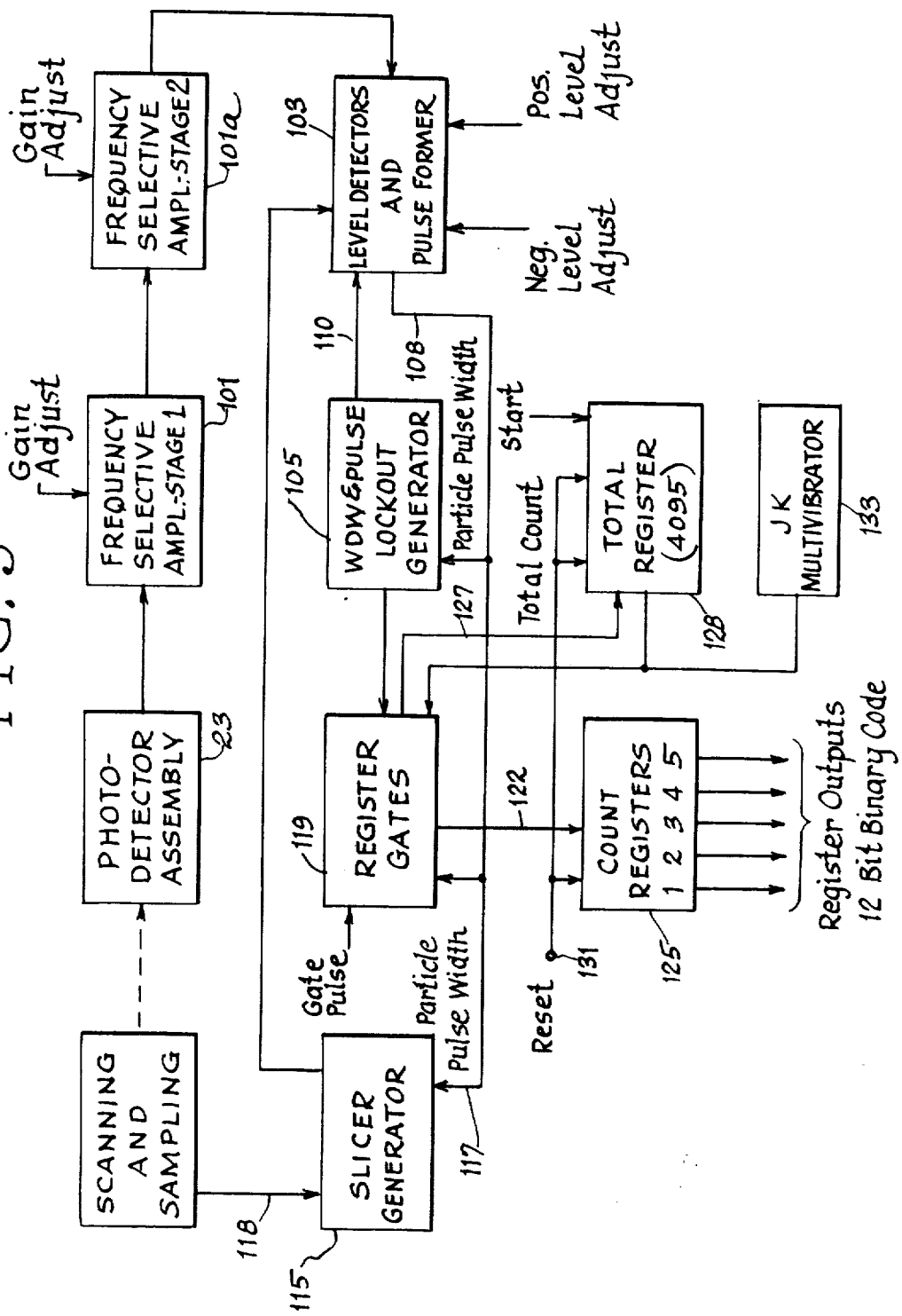

PARTICLE ANALYZING APPARATUS AND METHOD

BACKGROUND OF THE INVENTION

The invention relates to the analysis of particles of the same or different configuration in a continuously flowing medium, namely, counting of the particles and the classification thereof into groups of selected size ranges. A great variety of techniques for particles size analysis have been known, including automatic sieving and complex electronic systems for scanning photomicrographs of particle fields. For example, C. E. Lapple, Chemical Engineering, May 20, 1968, has described the types of size-analysis methods currently in use and G. Herdon, "Small Particle Statistics", 2nd Ed., Chapter 19, Academic Press, New York, (1960) and R. R. Irani and C. F. Callis, "Particle Size: Measurement, Interpretation and Application", Wiley, New York, (1963) contain detailed review of automatic sizing techniques.

It is evident from a consideration of particle-size intrumentation presently available that attention has been primarily directed toward the development of laboratory-type instruments for the analysis of discrete samples of particle-containing gases or liquids. However, in many industrial processes, a very real need exists for instrumentation capable of monitoring particle-size distribution in semi-transparent liquid slurries on-line in real-time at flow rates up to 5–10 gpm. The problem of classifying particles in liquid systems containing particles is of significant interest in ore refining, food processing, sedimentation, slurry analysis and many other fields.

The apparatus herein disclosed for monitoring particle-size distribution on a continuous basis is an electro-optical device using a flying spot scanning technique in which a two-dimensional scan traverses a field of particles moving at right angles to the direction of scan. The linear scan rate is a substantial multiple of the rate of flow of the sample. The horizontal direction of scan is preferably obtained by the use of a focused laser beam in conjunction with an oscillating mirror, there being an optical system for further reducing the laser beam and therefore increasing the resolution of the device with respect to particle size. The optical system is so designed as to focus the beam to the smallest practical dimensions at a plane transverse to the scan essentially midway of the sample stream. The vertical scan direction is obtained by virtue of the fluid flow through a transparent sample chamber through which the horizontally scanned spot is transmitted.

After passing through the liquid, the beam impinges on a fast, sensitive photodiode or equivalent photodetector. Particles intercepting the beam aperiodically interrupt the light reaching the photodetector to produce an aperiodic signal containing information indicative of the size and distribution of the particles. The sample stream is returned undisturbed to the process after traversing the sample chamber.

The signal is processed through low-noise, high-gain circuitry wherein the information relating to the size and distribution of the particles is extracted in the form of a train of pulses of varying width and fixed amplitude, i.e. the width of each pulse is an analogue of the particle size. Digital logic circuitry, viz. digital counter means, is utilized to count the pulses falling into predetermined size ranges and to store the several totals in registers. The number of ranges and the scope of each, and the method of read-out are determined in terms of each specific application. The general problems usually associated with automatic particle analysis based upon electro-optical scanning methods have been reviewed in the literature. Typical is M.A. Fisher et al. "Instrumental Methods of Particle Counting and Size Measurement," Proceedings of the 11th Industrial Waste Conference, Illinois Institute of Technology (1957). Errors most frequently cited are "coincidence" errors, "edge" errors, "Shape-Factor" errors and errors attributable to noise and band-width limitations in the electronic circuits.

Coincidence errors arise when (a) particles are counted more than once; (b) particles are masked by other particles, or (c) the scanning spot is larger than some particles in the field resulting in more than one particle masking the spot simultaneously.

Edge errors arise from particles being scanned near the perimeter of the scanned area, or when particles are scanned across a minor chord, thus producing a signal not directly related to the mean diameter of the particle.

Shape-factor introduces errors in that non-spherical particles may be scanned across any chord depending upon the orientation of the particle in the scanned field.

The present invention compensates for these errors by using a diffraction-limited spot and by taking advantage of the statistical nature of the problems.

SUMMARY OF THE INVENTION

Sampling of the particle-bearing fluent material, viz., a liquid or gas, is continuous. That is to say, part of the liquid or gas being analyzed is passed through a chamber of predetermined uniform cross section over a predetermined distance, this chamber having transparent, opposite side walls.

The rate of flow is adjustable to suit the particle conditions and, when determined, is controlled. In a typical application, e.g. in the case of a semi-transparent liquid slurry the velocity is approximately 3 m/sec (3 microns/ microsecond) when the flow rate is nominally 8 gpm. A basic commercial form of the apparatus will accommodate particles in the range of from 5 to 2,000 microns in liquid concentrations of approximately $10^7$ to $10^2$ particles per milliliter, depending upon size-range and density. The stream is introduced to the chamber via a geometric transition from the entrance conduit to the chamber per se. This assures a random distribution of particle sizes and orientations over the scanned area. Since, for particles up to 2,000 microns with densities up to 4 gm/cc, the Stokes' terminal velocity in water is approximately 8 m/sec, no significant settling will occur in the chamber as the same is only about 18 cm. from top to bottom. Under these conditions, the shape-factor error for non-spherical particles is reduced by the statistical averaging which results from scanning across any random chord or diameter.

The scanning spot is obtained from a light beam, the output of a laser or other source of light, e.g. thallium or ultraviolet, which is focused to a spot having an Airy diameter of about 10 microns. This is considerably less than the smallest particle to be regarded as significant in the analysis. In the present example, a laser will be referred to. Scanning on the horizontal axis is exactly 1,000 cps. (+1 percent) in the exemplificative system.

In carrying the present invention into practice, the beam is scanned by means of a mirror mounted on a driven tuning fork, oscillating through an angle of about 6°, Such means is reliable and extremely inexpensive. Although the scan is not usable per se, a selected linear portion of each cycle is availed of.

Inasmuch as only those particles less than 10 microns in diameter can contribute to coincidence errors in the focal plane of the spot, and the low range of the apparatus is 5 microns or less, e.g. 5 microns in the example, the errors associated with simultaneous scanning of more than one particle in the focal plane are virtually eliminated. As will appear, only a portion of the total scan is utilized in counting in order to reduce problems of non-linearity associated with a sinusoidal scan. With a nominal flow of 8 gpm and the given scanning conditions it may be shown that particles of approximately 4,000 microns mean diameter will be scanned once with a probablity of 1.0, and that the probability of scanning smaller particles decreases with decreasing particle size. These factors account for the minimization of coincidence errors in the focal plane.

After traversing the sample chamber, the beam impinges on a photodetector and the signal therefrom is fed through a frequency-selective amplifier which is designed to differentiate and band-limit the signal. The output of this amplifier is supplied to positive and negative level detectors which are regenerative and provide adjustment for level and hysteresis for optimum trade-off between sensitivity and noise rejection. The net effect of the amplifier and detectors is to "narrow" the effective "depth of field" of the column of liquid scanned and to produce a train of pulses corresponding to the leading and trailing edges of the particles scanned. The thus-generated pulses are converted to rectangular pulses having a width related to the size and relative position of the respective particles. The resulting pulses form the input to logic circuitry which converts the information contained in the pulses into the form dependent on the specific application. In the example, the logic circuitry comprises gates and registers which will accept pulses having widths falling into predetermined groups.

As just mentioned, only a portion, for example, one-third, of the total scan is utilized in the counting function. This selective utilization is accomplished by gating and counting circuits with a synchronizing signal derived from the scanner. Edge errors are completely eliminated by dithering the usable portion of the scan in a manner such that the width of the scan is allowed to increase on each cycle. Accordingly, the counting circuits are not gated off until the spot has traversed any particle at the end of a scanning interval. For a maximum particle diameter of 2,000 microns, the scanning gate is dithered by approximately 40 microseconds, which is a relatively small proportion of the preferred total gating time of 333 microseconds for the usable portion of the scan.

Errors attributable to noise and bandwidth limitations are reduced to a minimum consistent with the design parameters of the photodetector and the circuitry.

It will be appreciated that unavoidable errors are introduced because of the three-dimensional nature of the sample. From a practical point of view it is virtually impossible to mathematically relate the signal from the photodetector to the distribution of the particles. However, for a given particulate system corresponding to a given physical process, the statistics of the signal for a given set of sampling conditions will be related to the statistics of the particle-size distribution. This relationship has been investigated and, as will be shown, empirical relationships have been established which indicate that the technique disclosed herein is well suited for monitoring particle-size distribution in physical processes.

DESCRIPTION OF THE DRAWINGS

FIG. 5 is a block diagram of the whole system.

DESCRIPTION OF THE PREFERRED EMBODIMENT

The Electro-Optical Scanner

Figure 1:
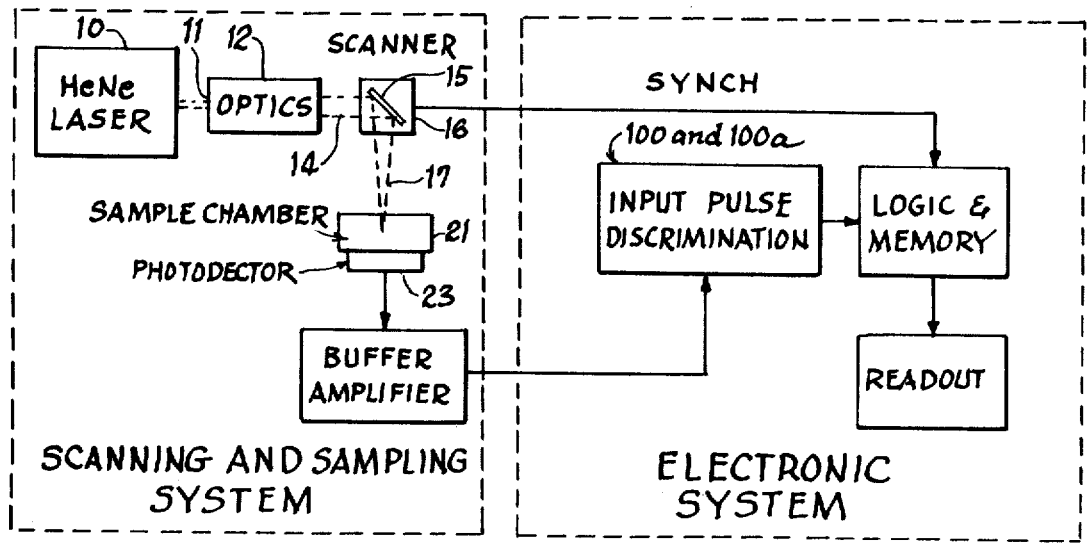
FIG. 1 is a block diagram showing the components of a preferred form of the invention.

Adverting to FIG. 1 there is shown a suitable laser 10, e.g. an HeNe gas laser, serving as a source of collimated monochromatic, coherent light. Monochromatic light significantly enhances the focusing ability of relatively standard optics.

As is recognized, the advantage of a laser beam is that is provides a high-intensity, sharply focused spot using optics of relatively few components which, in turn, allows the use of low sensitivity, high-speed trade-offs in solid state photodetectors. Alternative light sources are thallium and gas discharge high intensity lamps with appropriate narrow band filtering. The laser beam is expanded and passed through an aperture to provide an essentially uniform beam 11 of 18 mm. diameter. The beam is then focused by means of a single lens 12 of 120 mm. focal length to a spot 14 which is substantially diffraction-limited and has an Airy diameter of about 10 microns. In utilizing a system in accordance with the invention, optimum reliability of analysis depends largely on a spot at the focal plane which is of a practically attainable minimum size. Using optics of low cost, a spot size of 10 microns may be achieved without difficulty. With higher cost, 1 micron is obtainable with state-of-the-art optics. The degree of monochromacity required for focusing the spot is dictated primarily by the reduction in resolution of the spot due to chromatic aberration in the optics. Investigation has demonstrated that it is less costly to filter a laser source and use standard, simple optics than to employ high quality achromatic lens combinations. By the use of optics of short focal length, the depth of field is correspondingly reduced so that viewing of the particles occurs in a very thin plane-much narrower than the front-to-back dimension of the sample chamber.

Beam 14 impinges on a mirror 15 which is mounted on a driven tuning fork 16 so designed as to oscillate the beam 17 in a horizontal plane over an angle of about 6°. The fork is driven at 1,000 Hz by a suitable oscillator (not shown). Tuning forks of this character are described by Frank Dostal in International Electronics, March 1966, pages 1–6. The scanning frequency is so chosen as to intersect the particle field a large number of times. The parameters of the example were so selected as produce a scan in the scanning plane of 3.2 cm. With the foregoing arrangement, the maximum horizontal scan velocity at the center of the scan is $$1.6\omega \text{cm/sec} = 1.6 \cdot (2\pi) \cdot (500) \text{ cm/sec.}$$

$$\approx 5 \times 10^3 \text{ cm/sec.} = 50 \text{ microns/microsecond}$$

Under these conditions the spot, when intercepted by particles greater than 10 microns in the focal plane, will be blanked out in approximately 200 nanoseconds. Particles less than 10 microns will intercept only a portion of the beam, thus producing pulses of lower amplitude and faster rise times than the larger particles. The extent to which smaller particles are detectable by the technique just described is limited principally by the noise-sensitivity characteristics of the photodetector. However, the desired lower limit of 5 microns or less is well within the capability of the photodetector.

Figure 2:
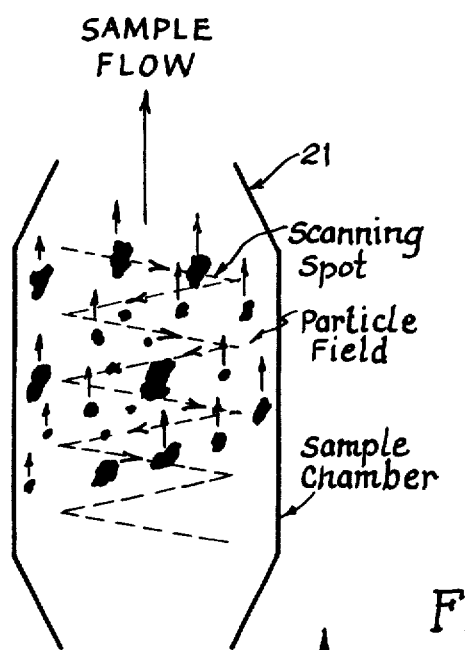
FIG. 2 is a schematic diagram to indicate the relationship of the scan to the moving particles.

FIG. 2 shows the relation between the scanning spot and the moving particles. To illustrate the relation adequately within the static limitations of a drawing, the particles are shown as fixed and the beam as a series of zigzag lines. As previously pointed out, scanning is in a horizontal plane and the sample is moving vertically.

The scanning beam 17 passes through a sample chamber 21 (FIG. 3) to be detailed subsequently, and is sensed by a rectangular PIN silicon photodiode 23 or other photoelectric device. The photodiode utilized in the example had a response time on the order of 10 nanoseconds, a low NEP (Noise equivalent power) of $10^{-14}$ watts and a sensitivity of 0.5 $\mu A/\mu W$. These response-time and noise characteristics are well adapted to the application, and the low sensitivity is sufficiently offset by the use of a high-intensity laser as a light source. The detector output is coupled to the signal-processing sub-system through a buffer amplifier to be described. A factor of importance in selecting the photodetector is the rise time, which must be small (less than 10 nanoseconds) in order that the leading and trailing edges of the 100 nanosecond pulses associated with small particles be adequately detected. At the present time these requirements point to photo-sensitive semi-conductor devices and photomultiplier tubes. Semi-conductor devices offer obvious circuit advantages.

The Sample Chamber

Figure 3:
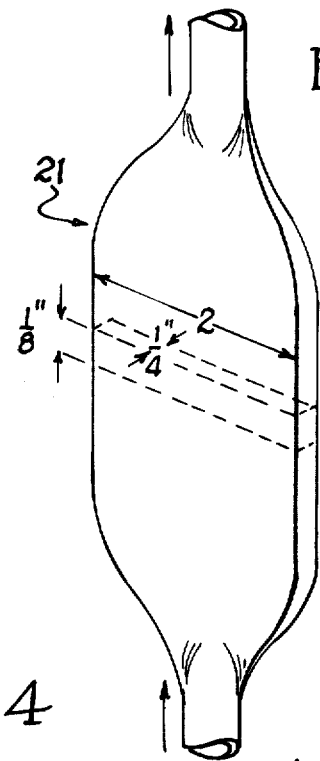
FIG. 3 is a more or less diagrammatic view of a preferred form of sampling chamber.

The sample chamber 21 of the example, shown somewhat schematically in FIG. 3, which is in perspective, is designed for a flow rate of 10 gal./min. of the slurry in a manner such as to produce an unbiased distribution of particles over a viewing section of ¼ × 2 inches cross section through an optical path one-eighth inch long. At the given flow rate all particles move through the viewing section at approximately 2 microns/microsecond, which is substantially less than the horizontal scan velocity and much greater than Stokes' velocity for all the particles being considered.

An important feature of the sample chamber lies in providing flow of the sample in a thin sheet. In this way, when the beam is brought to a focus at approximately that midplane of the chamber which is perpendicular to the axis of the beam, the bulk of the particles move in the focal plane and are detected with optimum efficiency.

The combined effect of the fluid motion and the horizontal scan is to produce a raster of the particle field with a horizontal-to-vertical scan ratio of 25:1. Using this technique all particles of 1,000 microns in the vicinity of the center of the focal plane will be intercepted once by the spot. The probability of striking smaller particles at least once will decrease with decreasing particle size.

The inlet and outlet connections to and from the sample chamber and the shaping of the ends of the chamber are designed to provide a transition from cylindrical pipe to a parallelepipedic volume such as will assure uniform particle dispersion independent of size, and to provide adequate tumbling of the particles in order to ake into account statistically the "shape factor" of particles other than spherical.

Electronics System

In summary form, the electronic portion of the system serves the following functions;
1. Acquires data during the linearized portion of the scan.
2. Discriminates between particles in the plane of focus and those not in the plane.
3. Distinguishes between pulse width (in time) and categorizes these widths.
4. Stores the number of pulses in each category in memory registers for subsequent readout.

Figure 4:
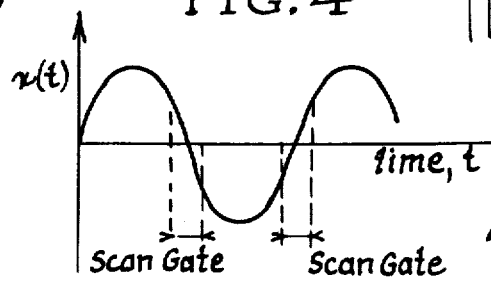
FIG. 4 is a diagram representing the output of the photodetector together with the gated portions thereof.

The graph of FIG. 4 shows about 1½ cycles of the scan, with amplitude (width of scan) shown as $X(t)$. A linear portion of each cycle corresponding to $\pm 30°$ of the sinusoid, is extracted by means of a gate to be described later. Over the gated region the scan velocity of the example is nearly constant at 50 microns/microsecond.

Pulse Discrimination and Reconstruction

In the exemplificative system these functions are accomplished in the following manner:

The signal from the photodetector 23 is applied to a two-stage frequency selective amplifier 101 and 101a, which discriminates between pulses with respect to amplitude and with respect to frequency content. Pulses which meet pre-determined requirements with respect to amplitude and frequency content are reconstructed, whereas pulses which do not meet such requirements are ignored. Each of amplifiers 101 and 101a includes a variable gain adjustment of from 100 to 1,000. This permits operation of the amplifiers in a linear mode over a wide range of input variables. The output of stage two is applied to the positive and negative level detectors and pulse-forming gating circuit 103.

When the leading edge of a particle pulse is detected and acquired, means are provided to prevent pulses derived from adjacent particles from initiating the chain of windows on the counting register and/or nesting within a window. In this connection "nesting" is defined as the inclusion of a block of data within a larger register which, unless avoided, would, in the present concept, result in a spurious count.

The foregoing desideratum is attained by an R–S flip-flop multivibrator 105 having its input derived from positive and negative level detectors 103 through conductor 108. The lockout pulse which is present during a window generation sequence is applied over conductor 110 to the pulse-forming gating circuit, the rectangular wave output of which prevents the output from the negative level detector from being applied to the generator 105 when the lockout pulse is present. Additionally, the trailing edge of the lockout pulse is counted by the total register since this edge can only be present if a particle has been acquired and a sequence of windows generated.

Slicer Generator

The slicer generator 115, sometimes called an amplitude gate or clipper-limiter, transmits only that portion of the signal input at 117 received over conductor 108 which falls between the positive and negative amplitude boundaries.

The sychronizing pulse at 118 from the scanner is fed to a suitable transistor, e.g. a type 2N3903, in the slicer generator 115, thence through a buffer amplifier (not shown), inverted twice in a hex inverter and then to a chain of monostable multivibrators. These latter are so arranged that two of them having a pulse duration of 0.33 milliseconds are centered around the midpoint of the sinusoidal scan (FIG. 4). These two pulses of interest are fed to an OR gate. The output of this gate is fed to the clear input of the multivibrator 105 which permits the trailing edges of the pulses to be dithered. Accordingly, the trailing edge is generated by either slicer or the trailing edge of the lockout pulse, if one is present and whichever occurs last. Thus, should a particle be present at the end of the slicer period, the slicer signal is continued until the pulse has been completed and measured.

Register Categorization

The particle pulse and the series of window pulses are applied to a series of NAND gates 119, the outputs of which are applied over conductor 122 to the inputs of the binary counter chains 125, identified in FIG. 5 as registers 1, 2, 3, 4 and 5 and, via a conductor 127, to a "total" register 128.

When the registers are reset by a pulse delivered at 131, their outputs are all in the logic one state, except for the "-total" register whose first bit is reset to the one state while all others are reset to zero state, thereby advancing its count by 1. The output of the total register is applied to the input of a JK-flip-flop multivibrator 133. Accordingly, when a count of 4,095 is acquired by the total register it shifts to an all-zero state and initiates an output from the multivibrator 133. This output is applied to appropriate gates (not shown) to terminate action of the counter. At this point, the "total" register is in an all-zero state, whereas registers 1, 2, 3, 4 and 5 are in states exhibiting the number of particle pulses acquired whose width is less than or equal to the associated window in time, but in inverted binary code.

SYSTEM OPERATION

1. The electronics sub-system is connected to line voltage by an "on-off" switch (not shown).
2. The laser is started by applying, through an appropriate switch, the specified trigger voltage.
3. The sample is introduced at a concentration of 1.5 percent by weight and at a rate between 5 and 10 gpm.
4. To obtain a count manually the reset 131 is energized by a button and then a "start" button on the electronics subsystem is pressed. The system will count a total of 4,095 and then stop automatically. The count in each of registers 1, 2, 3, 4 and 5 will be held in binary form for read-out with a voltmeter or the same may be interfaced to any digital readout system with an appropriate multi-plexing system. For each new count the procedure is repeated.
5. For automatic cycling of the start-reset cycle the system may be subjected to appropriate command signals. For this mode, an automatic readout system is required to read and store, or to display the counts in each register.

We claim:
1. Apparatus for analyzing the distribution of solid particles contained in a fluent medium and classifying the particles into size ranges and the quantity in each range comprising: a chamber having at least one pair of transparent opposite walls, said chamber having an inlet and an outlet, means to connect the inlet and outlet into a conduit through which the fluid medium is flowing to extract a sample at some predetermined rate, the path of flow through the chamber being in some predetermined direction, a source to emit a beam of light to be transmitted through the walls and medium, a lens system to focus the beam into a spot in the range of about 10 microns measured at a plane transverse to the scan substantially midway of said walls and parallel thereto the spot size being smaller than the smallest particle of interest in the analysis, means to traverse the beam in an oscillating scan across the moving medium and essentially at right angles to the direction of flow, the beam being reduced in intensity in accordance with interruption thereof by the particles, photoelectric means located for activation by the beam following transmission thereof through the medium to provide a train of output pulses containing information indicative of the size and distribution of the particles which are essentially in said plane, and circuit means responsive to the output of said photoelectric means for classifying the pulses into groups corresponding to the selected ranges.

2. Apparatus in accordance with claim 1 in which the source of light is monochromatic.

3. Apparatus in accordance with claim 1 in which the source is a laser.

4. Apparatus in accordance with claim 1 in which the direction of flow is vertical and the direction of scan is horizontal.

5. Apparatus in accordance with claim 1 in which the traversing means provides scan motion which is essentially harmonic.

6. Apparatus in accordance with claim 5 wherein the classifying means is arranged to utilize a linear portion of the scanning cycle.

7. Apparatus in accordance with claim 6 further characterized in that the counting means includes gating means, the beam-traversing means includes means to provide a synchronizing signal to initiate and terminate operation of the gating means to derive the linear portion of the scanning cycle.

8. Apparatus in accordance with claim 1 in which said traversing means includes a mirror mounted for oscillation to receive incident light from the beam and means for oscillating said mirror at the scan frequency and amplitude, the reflected light constituting the scanning spot, the scan frequency providing a linear velocity of the spot which is a substantial multiple of the velocity of the sample stream, whereby the particles as "seen" by the spot appear static during interception of the beam thereby.

9. Apparatus in accordance with claim 1 in which the classifying means includes means to count the pulses and to register the number thereof in each group.

10. Apparatus in accordance with claim 9 further characterized by means in the output-circuit means to de-activate the counting means upon acquisition of the leading edge of a particle pulse to avoid spurious pulses derived from adjacent particles.

11. Apparatus in accordance with claim 1 in which the classifying means includes means to distinguish between particles in the plane and those outside the plane.

12. Apparatus in accordance with claim 1 in which the cross-sectional area of the medium flowing through the chamber is so determined by the configuration of the chamber as to direct the medium past the scanning spot in a thin sheet, the mid-plane of the sheet being substantially coincident with the focal plane.

13. Apparatus in accordance with claim 1 further characterized in that the output-responsive means includes electrical components to clip the pulses to some predetermined voltage level.

14. The method of measuring the distribution of particles contained in a fluent medium as a function of time, comprising:
   a. extracting a sample of the medium,
   b. continuously flowing the sample through a chamber defined in part by a pair of opposite transparent walls,
   c. transmitting a beam of light through the walls and sample,
   d. converging the beam to a spot, on the order of about 10 microns at a focal plane which is essentially midway of said walls,
   e. causing the spot to oscillate in a plane substantially at right angles to the direction of flow through the chamber,
   f. translating the varying intensity of the transmitted light occasioned by the constantly changing distribution of particles presented by flow of the sample into voltage pulses,
   g. analyzing the pulses for amplitude and periodicity,
   h. sorting the pulses into a plurality of predetermined size groups, and
   i. registering the count in each group.

15. The method in accordance with claim 14 further characterized in that the linear rate of scan is a substantial multiple of the flow rate of the sample through the chamber.

16. The method in accordance with claim 14 in which the volumetric rate of flow of the sample is constant and the sorting of the pulses is determined in terms of particles per unit volume of the sample.

17. The method in accordance with claim 14 characterized by the further step of limiting the diffraction time, the spot at the focal plane.

18. The method of measuring the distribution of particles contained in a fluent medium as a function of time comprising:
   a. extracting a sample of the medium,
   b. continuously flowing the sample through a chamber defined in part by a pair of opposite transparent walls,
   c. transmitting a beam of light through the walls and sample,
   d. converging the beam to a spot on the order of about 10 microns,
   e. causing the spot to oscillate in essentially harmonic motion in a plane substantially at right angles to the direction of flow through the chamber,
   f. translating the varying intensity of the transmitted light occasioned by the constantly changing distribution of particles presented by flow of the sample into pulses modulating the sine wave representing the harmonic motion,
   g. analyzing the pulses for amplitude and periodicity,
   h. sorting the pulses into a plurality of predetermined size groups, and
   i. registering the count in each group.

19. The method in accordance with claim 18 further characterized in that only an essentially linear portion of the modulated sine wave is utilized in the analysis.

* * * * *

UNITED STATES PATENT OFFICE
CERTIFICATE OF CORRECTION

Patent No. 3,676,647        Dated July 11, 1972

Inventor(s) Robert Staffin et al

It is certified that error appears in the above-identified patent and that said Letters Patent are hereby corrected as shown below:

Column 2, line 21, "particle" should read -- particular --; column 5, line 13, after "raster", insert -- scan --; column 8, line 37, cancel "time," and insert -- of --.

Signed and sealed this 19th day of December 1972.

(SEAL)
Attest:

EDWARD M. FLETCHER, JR.
Attesting Officer

ROBERT GOTTSCHALK
Commissioner of Patents